3,390,101
CATALYST ACTIVATION PROCESS
Sigmund M. Csicsery, Greenbrae, Calif., assignor to Chevron Research Company, San Francisco, Calif., a corporation of Delaware
No Drawing. Filed Mar. 23, 1966, Ser. No. 536,625
4 Claims. (Cl. 252—455)

This invention relates to a process for the activation of crystalline zeolitic aluminosilicates to produce catalysts active for acid-catalyzed hydrocarbon conversion reactions. More particularly the present invention is directed to the activation of the hydrogen form of crystalline aluminosilicates which are substantially free of hydrogenating metal components and more especially to the activation of such hydrogen crystalline aluminosilicates which are produced from ammonium-exchanged crystalline aluminosilicates.

In recent years, crystalline zeolitic aluminosilicates, often referred to as molecular sieves, have come into prominence as catalysts for various hydrocarbon conversion reactions and various methods have been proposed for activating such catalysts. With aluminosilicate catalysts containing hydrogenating metal components, the activating pretreatment may involve calcination in air, followed by reduction of the hydrogenating metal component by contact with hydrogen or other reducing atmospheres. In U.S. Patent 3,197,399 concerning a hydrocracking catalyst composed of Group VIII noble metal hydrogenating component and a zeolitic molecular sieve cracking base, the noble metal hydrogenating component is found to be damaged by contact, in the oxidized state, with water vapor at temperatures above 200° F. and the damage to such metal component is corrected by a reduction-oxidation sequence which is repeated at least once. On the other hand with aluminosilicate catalysts which are substantially free of such hydrogenating metal components, the catalysts are generally pretreated by calcination only. U.S. Patent 3,130,006 describes the decationization of molecular sieves by thermal treatment to remove ammonium ions, if present, and water from the aluminosilicate structure.

The process of the present invention differs from the foregoing prior art in that the present acivation process is directed to crystalline aluminosilicates having hydrogen as a substantial portion of their cations and being substantially free of hydrogenating metal components, and further involves a modification or activation of the aluminosilicates themselves by a particular sequence of treating steps.

In accordance with the present invention hydrogen crystalline aluminosilicates are activated by a high temperature treatment involving the particular sequence of steps of:

(1) subjecting the aluminosilicates to a reducing atmosphere for a period of time equivalent to at least one hour when dry hydrogen is used,
(2) subjecting the aluminosilicates to an oxidizing atmosphere for a period of time equivalent to at least 0.25 hour when air is used, and
(3) then subjecting the treated aluminosilicates to a reducing atmosphere for a period of time equivalent to at least 0.25 hour when dry hydrogen is used, all of the foregoing steps being conducted at a temperature above 600° F. but below the temperature at which the crystallinity of said crystalline aluminosilicates is destroyed.

The aluminosilicates to which the present process is directed are generally the aluminosilicates having hydrogen cations introduced in any suitable manner. For example, the hydrogen cations may be incorporated in the zeolitic aluminosilicate by water leaching or by ion exchange with aqueous acid solutions. Such hydrogen aluminosilicates may also be prepared from the aluminosilicates having as cations ammonium ions or other ions readily convertible to hydrogen ions. Preferably, the present activation process is applied to hydrogen aluminosilicates prepared from ammonium-exchanged aluminosilicates. In this preferred embodiment, the ammonium-exchanged aluminosilicates are most desirably converted to the hydrogen form simultaneously with the first reducing atmosphere treatment of the present process.

In another preferred embodiment of the present invention, the hydrocarbon conversion activity of crystalline zeolitic aluminosilicates is further improved by contacting said aluminosilicates with hydrocarbons under conditions such that the hydrocarbons are adsorbed in the pores of the aluminosilicates and allowed to decompose. The hydrocarbon adsorption step should be prior to contacting the crystalline zeolitic aluminosilicates with the oxidizing atmosphere, and preferably prior to or during the first reducing atmosphere treatment.

Catalysts activated by means of the present invention find utility in numerous hydrocarbon conversion processes, especially where hydrogenation-dehydrogenation activity is not desired. For example, the catalysts activated by the process of the present invention find use in those processes where the acidic nature of the catalysts is important, such as alkylation, isomerization, and disproportionation reactions. The catalysts activated according to the present invention are especially useful in cracking processes. Thus, the present invention is directed to activating catalysts for hydrocarbon conversion processes which are acid-catalyzed, and wherein it is desirable not to hydrogenate or dehydrogenate the reactants or products. Furthermore, an object of the present invention is activating zeolitic aluminosilicates for use in hydrocarbon processes wherein the properties of the aluminosilicates themselves, particularly, the acidic reaction sites of the aluminosilicates, are important and the presence of metals, or their ions or compounds, on the catalysts is only of importance insofar as said metals, their ions or compounds, contribute to the acidity of the catalysts.

Since the aluminosilicates contemplated for use in the present invention contain no hydrogenating metal components, it is surprising that the combination of steps, and especially the steps which involve contacting the aluminosilicates with a reducing atmosphere, should produce more active catalysts than simply a calcination technique.

Both the natural and synthetic zeolitic aluminosilicates may be activated by the present process. The crystalline zeolitic aluminosilicates encompassed by the present invention comprise aluminosilicate cage structures in which alumina and silica tetrahedra are intimately connected with each other in an open three-dimensional crystalline network. The tetrahedra are cross-linked by the sharing of oxygen atoms. The spaces between the tetrahedra are occupied by water molecules prior to dehydration. Dehydration results in crystals interlaced with channels of molecular dimensions. Thus, the crystalline zeolitic aluminosilicates are often referred to as molecular sieves. In the hydrated form, the aluminosilicates can be represented by the formula:

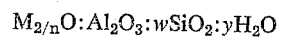

$$M_{2/n}O:Al_2O_3:wSiO_2:yH_2O$$

where M is a cation which balances the electrovalence of the tetrahedra; $n$ represents the valence of the cations; $w$, the moles moles of $SiO_2$; and $y$, the moles of water. The cation may be any one of a number of ions, such as, for example, the alkali metal ions, the alkaline earth ions, or rare earth ions. The cations may be mono-, di-, or trivalent.

Crystalline zeolitic aluminosilicates which find use for purposes of this invention possess relatively well-defined pore structures. The exact type of aluminosilicates is relatively unimportant as long as the pore structures comprise openings characterized by pore dimensions greater than 6 Angstroms and in particular, by uniform pore diameters of between approximately 6 and 15 Angstroms. The uniform pore structures wherein the pores are larger than approximately 6 Angstroms permit hydrocarbons access to reactant sites of the catalysts. Generally, in order to obtain aluminosilicates of the necessary pore dimensions, the silica to alumina mole ratio in the crystalline form should be greater than about 2.

A representative zeolitic aluminosilicate is, for example, the synthesized zeolite X which can be represented in terms of mole oxides as follows:

$$0.9 \pm 0.2 M_{2/n}O : Al_2O_3 : 2.5 \pm 0.5 SiO_2 : yH_2O$$

where M represents at least one cation having a valence of not more than 3; $n$ represents the valence of M; and $y$ is a value up to about 8 depending on the identity of M and degree of hydration of the crystal. Zeolite X is described in U.S. Patent 2,882,244.

Anther synthetic crystalline zeolitic aluminosilicate which may be used in the present invention is designated zeolite Y and may be represented in terms of the mole ratios of oxides for the sodium form as follows:

$$0.9 \pm 0.2 Na_2O : Al_2O_3 : wSiO_2 : yH_2O$$

wherein $w$ is a value greater than 3 and up to about 6 and $y$ may be a value up to about 9. Zeolite Y is described in U.S. Patent 3,130,007. For purposes of this invention, zeolite Y is preferable since it can be prepared in a form in which the exchangeable cations are substantially all hydrogen ions; that is, in a decationized form, without destruction of the crystal structure.

Various procedures are known for the preparation of synthetic crystalline zeolitic aluminosilicates. For example, these procedures generally involve the mixing and heating of a high silica/alumina ratio mixture of sodium silicate and sodium aluminate. The reagents are mixed under carefully controlled conditions to produce a crystalline product which may be subsequently ion-exchanged with a desired cation.

Hydrogen ions can be incorporated into the aluminosilicate structures through water leaching of the crystalline products. Another possible method involves contacting the aluminosilicates with a weakly acidic solution, as, for example, a hydrochloric acid solution, representing the inorganic acids, or an acetic acid solution, representing the organic acids. Since most aluminosilicates are unstable in the presence of high concentrations of acid, care must be exercised to maintain weakly acidic solutions. For purposes of this invention the preferred process for producing the hydrogen form of the aluminosilicates is the deammoniation of ammonium-exchanged aluminosilicates.

Where, in accordance with a preferred embodiment of the present invention, ammonium-exchanged aluminosilicates are to be used as starting materials for the activation process, the ammonium ions may be incorporated into the lattices of the crystalline aluminosilicate product, by contacting, for example, a sodium aluminosilicate with an aqueous solution containing the desired ammonium ions. Any soluble ammonium salts can be used to effect the ion exchange of the zeolitic cations providing the resulting salt formed during the ion exchange is soluble. If the formed salt is insoluble it may be precipitated within the pores of the zeolitic aluminosilicates. Suitable ammonium salts are the chlorides, bromides, or nitrates of ammonium. Compounds which are decomposable to ammonium ions may be incorporated into the zeolitic aluminosilicate lattices, as by ion-exchange with the zeolitic cations; the resulting zeolitic composites may then be activated by the present process. Suitable compounds, the cations of which are decomposable to ammonium or hydrogen, are the alkyl and aryl ammonium compounds, such as tetramethylammonium hydroxide and trimethylammonium hydroxide.

The crystalline zeolitic aluminosilicates containing ammonium ions can be deammoniated by heating to an elevated temperature. Although the deammoniation process, which drives off ammonia and leaves the hydrogen form of the aluminosilicates, can be accomplished in any particular atmosphere, it is preferred to deammoniate the aluminosilicates simultaneously with the first reducing atmosphere treatment, containing the contact of the deammoniated aluminosilicates with the reducing atmosphere for a period of time thereafter, and preferably for at least one hour thereafter. The ammonia begins to be expelled from the aluminosilicates at a temperature of about 400° F. with substantially all of the ammonia being removed by heating to a temperature of about 1000° F. At the lower temperatures, it is necessary to continue the heat treatment for longer periods of time to remove most of the ammonia. Conventional methods for the detection of ammonia may be used to indicate the extent of removal of the ammonia.

The hydrogen form of the crystalline zeolitic aluminosilicates to be activated according to the present process should contain a substantial portion of hydrogen. That is, at least 10 percent of the total sites available for cations should be occupied by hydrogen. The greatest benefit of the present activation process can be realized using aluminosilicates containing a predominant amount of hydrogen, that is, greater than 90 percent of the available sites being occupied by hydrogen. In a preferred embodiment of the present process, wherein hydrogen aluminosilicates are prepared from ammonium-exchanged aluminosilicates, the ammonium ions should also occupy at least 10 percent of the exchangeable sites, and preferably more than 90 percent. The remaining available sites of the zeolitic aluminosilicates may be occupied by the cations of the alkali metals, the alkaline earths, or rare earths, or any other ions which do not contribute in an appreciable manner to the hydrogenation-dehydrogenation activity of the catalysts.

After the zeolitic aluminosilicates have been exchanged with the desired ions they may be dried and activated by the process of the present invention. In order to obtain catalysts with the highest activity, the aluminosilicates between the time they are prepared as crystals containing hydrogen or ammonium ions until the end of the first step of the present process (the initial reducing atmosphere treatment step) are not exposed to oxidizing atmospheres at high temperatures such as above 400° F. for appreciable periods of time. For example, with temperatures in the range of 400–600° F. the crystalline aluminosilicates are kept out of contact with oxygen containing gases, such as air, for periods longer than about six hours, but at higher temperatures, such as 1000° F., the contact with oxygen containing gases should be less than about two hours.

The temperature at which the zeolitic aluminosilicates are subjected to the reducing atmosphere-oxidizing atmosphere reducing atmosphere sequence should be between approximately 600° and 1400° F., and preferably from about 800° to 1200° F., the temperature not exceeding that at which a substantial portion of the crystallinity of the aluminosilicates is destroyed. The maximum temperature will depend on the particular type of zeolitic aluminosilicates involved, but will seldom exceed 1400° F.

It is understood that for safety reasons it may be necessary to purge the zeolitic aluminosilicates with a non-reacting gas between the individual steps in the reducing atmosphere-oxidizing atmosphere-reducing atmosphere sequence. Suitable purge gases are the inert gases, as, for example, argon, but the preferred gas is nitrogen.

The reducing atmosphere for use in the first step of the present invention may suitably be carbon monoxide, or such hydrocarbons as methane or ethane, but is preferably hydrogen, and most preferably dry hydrogen. The reducing atmosphere treatment should be continued for at least one hour and preferably at least five hours when dry hydrogen is used and for an equivalent time when another gas is involved. Generally, a stream of reducing gas is continuously passed through a bed of the zeolitic aluminosilicate in a high temperature vessel for the required period of time.

The oxidizing atmosphere may be a gas such as carbon dioxide, but is preferably an oxygen-containing gas. The oxygen-containing atmosphere may be diluted with suitable gases such as the inert gases or nitrogen. Air is preferred for purposes of this invention and most preferably dry air. The time of contact with dry air as the oxidizing atmosphere may be as high as six hours at the lower temperatures of activation. Generally, however, a contact time of 0.25 hour to two hours is preferred. Longer contact times may result in deactivation of the catalysts, especially at the higher temperatures. Thus, the oxidizing step with dry air as the oxidizing atmosphere is carried out for 0.25–6 hours at temperatures of 600° F.–1400° F. with the shorter times being with the higher temperatures and vice versa. Hence, with temperatures above 900° F., it is preferred to treat the catalyst for less than two hours. When a gas other than dry air is used as the oxidizing atmosphere, the period of contact of the aluminosilicates with the oxidizing atmosphere should be for a time equivalent to that specified for dry air.

The gases applicable as the final reducing atmosphere may be the same as those mentioned for use in the first pretreatment step. Preferably, the final reducing atmosphere is dry hydrogen. However, it is also considered as part of this invention that the final reducing treatment may be accomplished by contacting the zeolitic aluminosilicates with the hydrocarbon feed. The problem encountered in contacting the zeolitic aluminosilicates with the feed is the undesirable oxidation of hydrocarbons in the feed to coke or carbon dioxide. The initial portion of the feed is thus partially wasted, and as a consequence coke accumulation on the catalyst may be increased.

The final reduction step should be for at least 0.25 hour when dry hydrogen is used as the reducing atmosphere, with a maximum of ten hours. When a gas other than dry hydrogen is used, including the hydrocarbon feedstock, as the final reducing atmosphere, the minimum period of contact of the aluminosilicates with the reducing atmosphere should be for a time equivalent to 0.25 hour in dry hydrogen. The maximum time of contact is also determined by equivalency with dry hydrogen.

The catalyst acidity for hydrocarbon conversion reactions can be increased if prior to completion of the first step of the activation process, namely, exposure of the aluminosilicates to a reducing atmosphere, the aluminosilicates are contacted with hydrocarbons capable of adsorbing in the pores and caused to decompose. The hydrocarbons may be any organic compounds which will adsorb in the pores of the aluminosilicates. It is preferred to use aromatics or olefins and most preferably the alkyl aromatics, such as methylethylbenzene. Preferably, the hydrocarbons are in the vapor phase during contact with the aluminosilicates. The light hydrocarbons such as methane, ethane and propane do not readily adsorb in the pores of the zeolitic aluminosilicates at the temperatures involved, that is, temperatures greater than 600° F.

For purposes of this invention, it is preferred that an amount of hydrocarbon necessary to substantially cover the surface area of the aluminosilicates when adsorbed be used in order to adequately contribute to the activation of the aluminosilicates. This amount will vary depending on the type of aluminosilicates and can readily be determined by known procedures. As the temperature of the aluminosilicates is increased, most of the adsorbed hydrocarbons will decompose to coke, with, of course, a certain amount being expelled from the pores.

In an embodiment of the present invention wherein ammonium-exchanged aluminosilicates are converted to the hydrogen form simultaneously with the first reducing atmosphere, it may be desirable to further activate the aluminosilicates by the adsorption of hydrocarbons in the pores with subsequent conversion to carbonaceous deposits. The hydrocarbon adsorption treatment may be performed any time during the ammonia removal. Generally, however, it is preferred that the hydrocarbons be contacted with the aluminosilicates after substantially all the ammonia has been removed since this permits the hydrocarbons to adsorb more readily in the pores of the aluminosilicates. Since substantially all the ammonia will have been removed by subjecting the aluminosilicates to the reducing atmosphere at temperatures above about 600° F., the aluminosilicates should preferably be cooled to a temperature below about 400° F. before addition of the hydrocarbons. Then, either simultaneously with contacting the zeolitic aluminosilicates with the hydrocarbons, or subsequently thereto, the temperature is raised to decompose the hydrocarbons to carbonaceous deposits in the pores.

The reason hydrocarbon adsorbed increases the catalytic activity of the aluminosilicates is not fully understood. It may possibly be a result of the hydrocarbons or carbonaceous deposits supporting the crystal structure of the aluminosilicates at the high temperatures involved, thereby prohibiting any significant collapse in the crystal structure. It is also possible that the hydrocarbons or carbonaceous deposits protect the acidic sites of the aluminosilicates during the reducing and oxidizing steps by depositing on and hence covering the acidic sites. It is not intended in any way, however, to be limited in the present invention to a theory explaining the increased activity of zeolitic aluminosilicates which have been subjected to a hydrocarbon adsorption treatment.

The present invention may be more fully understood by reference to the following examples.

Example 1

A commercially available sample of the sodium form of zeolite Y was contacted with a solution of silver nitrate, the concentration of silver nitrate and length of contact being sufficient to produce a silver zeolitic aluminosilicate containing substantially no sodium. The silver aluminosilicate was thereupon contacted with a solution of ammonium thiocyanate to remove all the silver as silver thiocyanate from the aluminosilicate and leave the ammonium form of the aluminosilicate. The above described process is a well-known procedure in the art for producing an ammonium zeolitic aluminosilicate and is more fully described in U.S. Patent 3,130,006.

The resulting ammonium zeolitic aluminosilicate was substantially dried at about 400° F. The sodium content of the ammonium aluminosilicate was approximately 72 p.p.m. A portion of the above prepared ammonium aluminosilicate was activated by the process of the present invention. This portion, referred to as catalyst A, was contacted at 1000° F. for sixteen hours with a dry hydrogen atmosphere, then subjected to an oxygen-containing atmosphere at 900° F. for one hour, and finally, contacted with hydrogen atmosphere at 900° F. for a period of one hour. Hydrogen was passed in contact with the aluminosilicate at a rate of 70 milliliters hydrogen per milliliter aluminosilicate per minute. The oxygen-containing atmosphere consisted of a 3:1 mole ratio mixture of nitrogen and air, and was contacted with the aluminosilicate at a rate of 120 milliliters oxygen-containing gas per milliliter aluminosilicate per minute. In the above process, the ammonium was substantially all removed as ammonia during the initial hydrogen contact.

Another portion of the ammonium aluminosilicate, referred to as catalyst B, was activated simply by calcining the aluminosilicate at 1000° F. in a hydrogen atmosphere for a period of sixteen hours. The rate at which hydrogen was contacted with catalyst B was the same as that used with catalyst A.

The two catalysts were then individually tested for isomerization and disproportionation activity by passing 1-methyl-2-ethylbenzene through a bed of catalyst in a reaction zone, and in the presence of hydrogen. The isomerization reaction produced 1-methyl-3-ethylbenzene and 1-methyl-4-ethylbenzene, the sum total of which products is measured as "isomerization products." The disproportionation reaction produced toluene and methyldiethylbenzenes, the sum total of which products is measured as "disproportionation products." The reaction conditions consisted of a temperature of 400° F., a pressure of one atmosphere, a hydrogen to feed mole ratio of 3, and a feed liquid hourly space velocity (LHSV) of 8. The products were collected and analyzed during the interval of time between 40–80 minutes after the beginning of the run. The conversion to isomerization and disproportionation products, and the total conversion are tabulated in Table I.

TABLE I

| | A | B |
|---|---|---|
| Catalyst Activation: | | |
| First pretreatment in $H_2$: | | |
| Temperature, ° F | 1,000 | 1,000 |
| Time, Hours | 16 | 16 |
| Pretreatment in Air: | | |
| Temperature, ° F | 900 | |
| Time, Hours | 1 | |
| Second pretreatment in $H_2$: | | |
| Temperature, ° F | 900 | |
| Time, Hours | 1 | |
| Products: | | |
| Isomerization Products (Mole percent of total products) | 30.1 | 16.4 |
| Disproportionation Products (Mole percent of total products) | 22.9 | 19.5 |
| Total Conversion (Mole percent products/mole feed) | 59.3 | 39.3 |

Isomerization and disproportionation reactions are considered to be acid-catalyzed reactions. Thus, the process of the present invention activated a catalyst for acid-catalyzed hydrocarbon conversion processes. It is noted that the isomerization increased nearly twofold when the catalyst was activated by the process of the present invention. Furthermore the disproportionation activity increased by more than 15 percent as a result of the present activation process.

Example 2

An ammonium zeolitic aluminosilicate of the Y type was prepared as in the previous example. Two portions of the ammonium aluminosilicate, hereafter referred to as catalysts C and D, were contacted with the hydrocarbon, 1-methyl-2-ethylbenzene, in the vapor phase, at a temperature of about 400° F. for a sufficient time to permit said hydrocarbon to adsorb in the pores of the zeolitic aluminosilicate and with enough hydrocarbon present to substantially cover the internal surface area. Catalyst C was subjected to the hydrocarbon adsorption treatment prior to deammoniation of the aluminosilicate. 1-methyl-2-ethylbenzene, in the vapor phase, was contacted with catalyst C for 22.5 minutes at a flow rate of 8 milliliters hydrocarbon per milliliter catalyst per hour, the hydrocarbon being measured in the liquid state at room temperature. No hydrogen was contacted with the catalyst during the hydrocarbon treatment. After adsorption of the hydrocarbon, the temperature was raised to 1000° F. as the catalyst was contacted with hydrogen. The resulting increase in temperature resulted in the deammoniation of the aluminosilicate. After a contact time of 16 hours in hydrogen at 1000° F., catalyst C was subjected to an oxygen-containing atmosphere consisting of a 3:1 mole ratio of nitrogen to air for one hour at 900° F. and then to a hydrogen atmosphere for one hour at 900° F. The flow rates of the oxidizing and reducing atmospheres were the same as in Example 1.

Catalyst D was deammoniated prior to the hydrocarbon adsorption step by contact with a 3:1 mole ratio nitrogen-air atmosphere at a temperature of 900° F. for one hour at a rate of 120 milliliters gas per milliliter catalyst per minute, and then with a dry hydrogen atmosphere at 1000° F. for 0.25 hour at a flow rate of 70 milliliters hydrogen per milliliter catalyst per minute. The deammoniated catalyst was subsequently cooled to 400° F. and then contacted with 1-methyl-2-ethylbenzene in the vapor phase for 85 minutes at a rate of 8 milliliters hydrocarbon per milliliter catalyst per hour, measured as the liquid at room temperature. Hydrogn, at a flow rate of 70 milliliters hydrogen per milliliter catalyst per minute, was contacted with the catalyst during the hydrocarbon adsorption treatment, the hydrogen to hydrocarbon mole ratio being 3:1. Thereafter, catalyst D was subject to the same reducing atmosphere-oxidizing atmosphere-reducing atmosphere sequence as catalyst C.

Another two portions of the above ammonium zeolitic aluminosilicate were activated for hydrocarbon conversion reactions by the process of the present invention but without a hydrocarbon adsorption treatment. In particular, the two portions were subjected to a reducing atmosphere-oxygen-containing atmosphere-reducing atmosphere sequence under the same conditions of temperature, time and flow rates as catalysts C and D.

The catalysts were tested individually in a reaction zone for hydrocarbon conversion activity. A hydrocarbon feed consisting of 1-methyl-2-ethylbenzene was contacted with the catalysts in the presence of hydrogen under reaction conditions of a temperature of 400° F., a pressure of one atmosphere, a hydrogen to feed mole ratio of 3 and a liquid hourly space velocity equal to 8. The products were collected and analyzed during the interval of time between 40 to 80 minutes after starting the run. The results of the total conversion of the feed to products through isomerization and disproportionation reactions are given in Table II. The average conversion of the two portions which were not protected with hydrocarbons is given, and is referred to as catalyst E.

TABLE II

| | Hydrocarbon Protection | | No Protection |
|---|---|---|---|
| Catalyst | C | D | E |
| Total Conversion (Mole percent products/mole feed) | 65.9 | 61.9 | 58.1 |

The adsorption of hydrocarbons into the pore structure of the zeolitic aluminosilicates as part of the activation process results in catalysts of higher activity than catalysts with no hydrocarbon pretreatment. A small increase in percent conversion can result in a significant increase in production and, hence, savings in a large scale plant operation. The increase in conversion activity shown in Table II is considered significant.

Example 3

An ammonium zeolitic aluminosilicate (Y type), prepared as in Example 1, was activated by the particular sequence of steps of subjecting the aluminosilicate to an inert atmosphere, namely helium, for sixteen hours at 1000° F., the helium flowing in contact with aluminosilicate at a rate of 70 milliliters helium per milliliter aluminosilicate per minute; subjecting the aluminosilicate to a 3:1 mole ratio mixture of nitrogen-air (oxidizing atmosphere) for one hour at 900° F., the flow rate of the oxidizing atmosphere being 120 milliliters oxidizing atmosphere per milliliter catalyst per minute; then subjecting the aluminosilicate to a dry hydrogen atmosphere (reducing atmosphere) for one hour at 900° F., the hydrogen flow rate being 70 milliliters hydrogen per milliliter aluminosilicate per minute. The activated aluminosilicate was tested for isomerization and disproportionation activity by passing 1-methyl-2-ethylbenzene in contact with the aluminosilicate in the presence of hydrogen at a temperature of 400° F., a pressure of one atmosphere, a hydrogen to feed mole ratio of 3, and a feed liquid hourly space velocity (LHSV) of 8. Conversion products collected between 40 to 80 minutes after start of the run were analyzed. The conversion to isomerization and disproportionation products as well as the total conversion are shown in Table III.

TABLE III

| | |
|---|---|
| Isomerization products (mole percent of total products) | 14.0 |
| Disproportionation products (mole percent of total products) | 21.0 |
| Total conversion (mole percent products/mole feed) | 38.3 |

The results in Table III should be compared with results in Table I, and in particular, the results with catalyst A of Table I. An activation process involving an inert atmosphere as the first step does not produce the catalytic activity that results from the activation procedure of the present invention.

Example 4

An ammonium aluminosilicate (Y type) was prepared by the procedure outlined in Example 1. This aluminosilicate was activated by the sequence of steps of: (1) subjecting the aluminosilicate to a 3:1 mole ratio mixture of nitrogen and air (oxidizing atmosphere) for sixteen hours at 1000° F., (2) then subjecting the aluminosilicate to a hydrogen atmosphere (reducing atmosphere) for eighteen hours at 100° F. The gas flow rates for the respective gases were the same as in the previous examples. The aluminosilicate thus treated was tested for isomerization and disproportionation activity under reaction conditions as in the previous examples. The results are tabulated in Table IV.

TABLE IV

| | |
|---|---|
| Isomerization products (mole percent of total products) | 15.0 |
| Disproportionation products (mole percent of total products) | 15.7 |
| Total conversion (mole percent products/mole feed) | 36.1 |

The above results should be compared with the results obtained with catalyst A in Example 1. Long exposure to an oxygen-containing atmosphere produces a catalyst low in activity when compared to the catalysts activated by the process of the present invention.

I claim:
1. A method of activating a crystalline zeolitic aluminosilicate having hydrogen as a substantial portion of its cations and being substantially free of hydrogenating metal components, said aluminosilicate having a pore size of at least 6 Angstroms, which activation method comprises the sequence of steps of:
   (1) subjecting said aluminosilicate to a reducing atmosphere for a period of time equivalent to at least one hour when dry hydrogen is used,
   (2) subjecting said aluminosilicate to an oxidizing atmosphere for a period of time equivalent to at least 0.25 hour when dry air is used, and
   (3) subjecting said aluminosilicate to a reducing atmosphere for a period of time equivalent to at least 0.25 hour when dry hydrogen is used, each of said steps being carried out above 600° F. but below the temperature at which a substantial portion of the crystallinity of said aluminosilicate is destroyed.
2. The method of claim 1, wherein said aluminosilicate is first produced from an ammonium-exchanged crystalline aluminosilicate.
3. The method of claim 1, wherein prior to completion of step (1) of exposure to a reducing atmosphere, a hydrocarbon is brought into contact with, and is adsorbed upon, said aluminosilicate under conditions whereby a carbonaceous deposit is formed on said aluminosilicate.
4. The method of claim 1, wherein said crystalline zeolitic aluminosilicate is of the Y crystal type.

References Cited
UNITED STATES PATENTS

| | | | |
|---|---|---|---|
| 3,033,778 | 5/1962 | Frilette | 208—120 |
| 3,201,356 | 8/1965 | Kress et al. | 252—455 |
| 3,239,471 | 3/1966 | Chen-Hu Chin | 252—455 |
| 3,344,086 | 9/1967 | Cramer et al. | 252—455 X |

DANIEL E. WYMAN, *Primary Examiner.*

C. F. DEES, *Assistant Examiner.*

UNITED STATES PATENT OFFICE
CERTIFICATE OF CORRECTION

Patent No. 3,390,101                        June 25, 1968

Sigmund M. Csicsery

It is certified that error appears in the above identified patent and that said Letters Patent are hereby corrected as shown below:

Column 4, line 12, "containing" should read -- continuing
Column 5, line 53, after "acidity" insert -- and activity
Column 9, line 29, "100° F." should read -- 1000° F. --.

Signed and sealed this 2nd day of December 1969.

(SEAL)
Attest:

Edward M. Fletcher, Jr.
Attesting Officer

WILLIAM E. SCHUYLER, JR.
Commissioner of Patents